US012687965B1

(12) United States Patent
Hanebutte

(10) Patent No.: US 12,687,965 B1
(45) Date of Patent: Jul. 21, 2026

(54) METHOD AND SYSTEM FOR APPROXIMATING ACTIVATION FUNCTION WITH FLOATING POINT FORMAT TYPE USING A TABLE

(71) Applicant: Marvell Asia Pte Ltd, Singapore (SG)

(72) Inventor: Ulf Hanebutte, Gig Harbor, WA (US)

(73) Assignee: Marvell Asia Pte Ltd, Singapore (SG)

( * ) Notice: Subject to any disclaimer, the term of this patent is extended or adjusted under 35 U.S.C. 154(b) by 15 days.

(21) Appl. No.: 19/040,794

(22) Filed: Jan. 29, 2025

Related U.S. Application Data

(60) Provisional application No. 63/642,470, filed on May 3, 2024.

(51) Int. Cl.
*G06F 12/00* (2006.01)
*G06F 3/06* (2006.01)

(52) U.S. Cl.
CPC .......... *G06F 3/0611* (2013.01); *G06F 3/0659* (2013.01); *G06F 3/0673* (2013.01)

(58) Field of Classification Search
CPC ..... G06F 3/0611; G06F 3/0659; G06F 3/0673
USPC ......................................................... 711/105
See application file for complete search history.

(56) References Cited

U.S. PATENT DOCUMENTS

| | | | | |
|---|---|---|---|---|
| 2019/0244141 A1* | 8/2019 | Sodani | .................... | G06N 20/10 |
| 2021/0019116 A1* | 1/2021 | Sun | .......................... | G06F 7/556 |

FOREIGN PATENT DOCUMENTS

| | | | | | |
|---|---|---|---|---|---|
| GB | 2185606 A | * | 7/1987 | ............... | G06T 9/20 |
| JP | 2020004398 A | * | 1/2020 | ............. | G06N 3/048 |
| WO | WO-2023008984 A1 | * | 2/2023 | ............. | G06F 5/012 |

* cited by examiner

*Primary Examiner* — Mardochee Chery

(57) ABSTRACT

A method includes storing a first/second set of biased exponents associated with a first/second plurality of input floating point data respectively in a memory. The first set of biased exponents defines a positive piecewise linear range associated with a positive piecewise linear approximation region of a function. The second set of biased exponents defines a negative piecewise linear range associated with a negative piecewise linear approximation region of the function. The positive/negative piecewise linear approximation regions include a first/second plurality of subregions respectively. Each subregion of the first and the second plurality of subregions includes at least one or more linear approximations. The method includes storing indices data for mapping each linear approximation with each subregion of the first and the second plurality of subregions to a unique index value. An offset and a slope for each of the unique index value are stored.

34 Claims, 12 Drawing Sheets

700

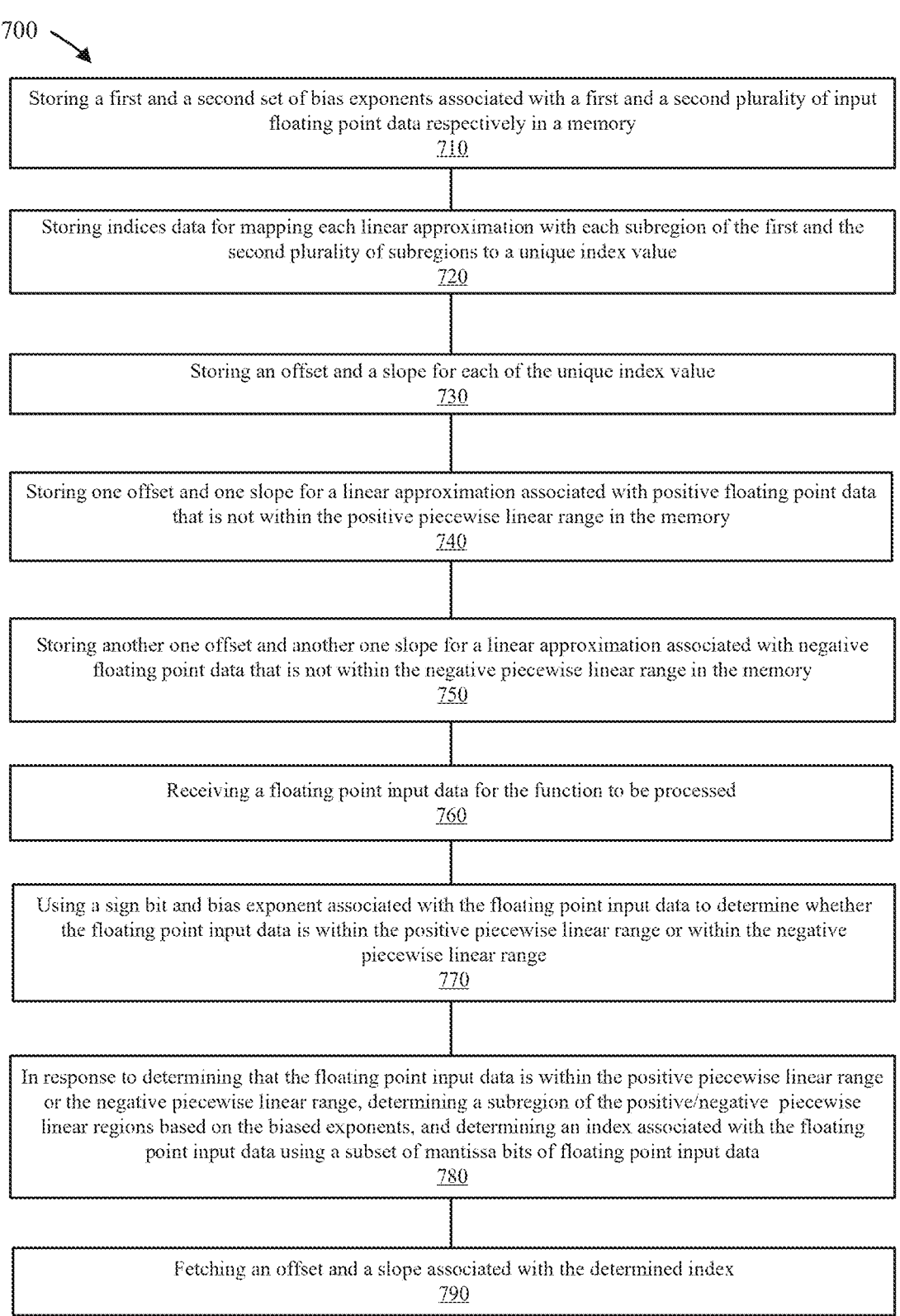

Storing a first and a second set of bias exponents associated with a first and a second plurality of input floating point data respectively in a memory
710

Storing indices data for mapping each linear approximation with each subregion of the first and the second plurality of subregions to a unique index value
720

Storing an offset and a slope for each of the unique index value
730

Storing one offset and one slope for a linear approximation associated with positive floating point data that is not within the positive piecewise linear range in the memory
740

Storing another one offset and another one slope for a linear approximation associated with negative floating point data that is not within the negative piecewise linear range in the memory
750

Receiving a floating point input data for the function to be processed
760

Using a sign bit and bias exponent associated with the floating point input data to determine whether the floating point input data is within the positive piecewise linear range or within the negative piecewise linear range
770

In response to determining that the floating point input data is within the positive piecewise linear range or the negative piecewise linear range, determining a subregion of the positive/negative piecewise linear regions based on the biased exponents, and determining an index associated with the floating point input data using a subset of mantissa bits of floating point input data
780

Fetching an offset and a slope associated with the determined index
790

FIGURE 7

METHOD AND SYSTEM FOR APPROXIMATING ACTIVATION FUNCTION WITH FLOATING POINT FORMAT TYPE USING A TABLE

CROSS-REFERENCE TO RELATED APPLICATIONS

This application claims the benefit of U.S. Provisional Patent Application No. 63/642,470, filed May 3, 2024, which is incorporated herein in its entirety by reference.

BACKGROUND

Applied Machine Learning (ML) is a booming field that utilizes graphs with many operations such as matrix-matrix-multiplies, convolution, as well as non-linear activation functions. Initially a handful of activation functions had been used, however, in recent years the number of activation functions has increased. Activation functions are generally computationally intensive and as such result in latencies and are therefore unsuitable for use in real-time.

ML utilizes a cascade of layers of nonlinear processing units and algorithms for feature extraction and transformation with a wide variety of usages and applications. ML typically involves two phases, training, which uses a rich set of training data to train a plurality of machine learning models, and inference, which applies the trained machine learning models to actual applications. Each of the two phases poses a distinct set of requirements for its underlying infrastructures. Various infrastructures may be used, e.g., graphics processing unit (GPU), a central processing unit (CPU), a Field Programmable Gate Array (FPGA), an Application Specific Integrated Circuit (ASIC), etc. Specifically, the training phase focuses on, as a non-limiting example, GPU or ASIC infrastructures that scale with the trained models and retraining frequency, wherein the key objective of the training phase is to achieve high performance and reduce training time. The inference phase, on the other hand, focuses on infrastructures that scale with the applications, user, and data, and the key objective of the inference phase is to achieve energy (e.g., performance per watt) and capital (e.g., return on investment) efficiency. Inference phase of ML is usually very computationally and data intensive. Unfortunately, as the input data and model sizes grow, data movement becomes a bottleneck and data processing increases because in order to perform simple processing, three operations or instructions are performed for each data, e.g., load, processing, and store. As the amount of data grows, performing these three operations or instructions becomes burdensome. Moreover, the current computing architecture is not scalable and is not well suited for ML and its applications, since a lot of time goes in loading and storing the data in comparison to processing the data.

ML models are generally very large and complex in nature. For example, ML models may be provided as graphs containing many nodes (e.g., layers, operators, etc.) that operate on large multi-dimensional tensors. It is appreciated that each layer or node of a ML model may include one or more activation functions. An activation function of a node in an artificial neural network may be a function that calculates the output of a node based on its input and/or weights associated therewith.

Traditionally, some have generated lookup tables for a small number of activation functions that are symmetric (positive range and negative range are symmetric) and calculate the approximation values for the positive range only. However, not only the number of activation functions have increased substantially but they are becoming more complex with a majority of them no longer symmetric. As such, the conventional methodology to create a table for the positive range under the assumption that the function is symmetric is no longer true.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7 shows generating and using a table for linear approximation associated with an activation function according to one aspect of the embodiments.

DETAILED DESCRIPTION

Figure 1:
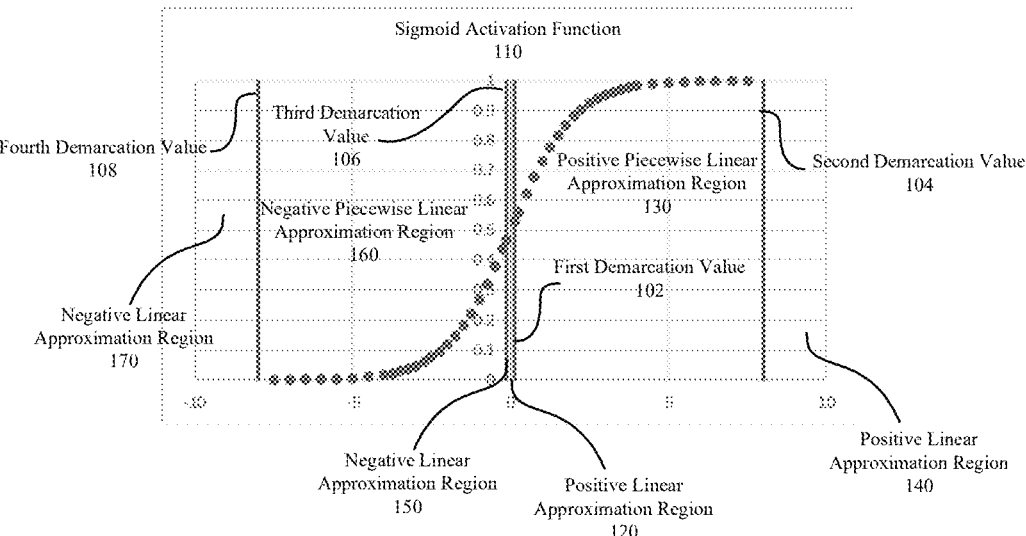
FIG. 1 shows an activation function and linear approximation of the activation function according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A need has arisen to generate a table for use in linear approximation of a function, e.g., an activation function, with both positive and negative ranges where the positive range and the negative range of the function may be unsymmetric. The embodiments described herein expand the generation of a single table that was traditionally used for linear approximation of a symmetric function, as described in U.S. Pat. No. 10,997,510, which is incorporated herein by reference in its entirety, to functions are that may be asymmetric. It is appreciated that an activation function may be but is not limited to a mathematical function or operation, e.g., a hyperbolic tangent (tanh) function, sine function, cosine function, soboleva modified hyperbolic tangent (smht) function, Gaussian Error Linear Unit (GELU) function, Exponential Linear Unit (ELU) function, Scaled Exponential Linear Unit (SELU) function, Leaky Rectified Linear Unit (Leaky ReLU) function, Parametric rectified linear unit (PRELU) function, Rectified Parametric Sigmoid Unit function, sigmoid function, etc. It is appreciated that the embodiments and generation of an activation table associated with an activation function with floating point (FP) 16 format type is described for illustration purposes and should not be construed as limiting the scope of the embodiments. Moreover, it is appreciated that the generated activation table, as described below, has a 4-byte width layout for illustration purposes and should not be construed as limiting the scope of the embodiments. As such, the activation table size may be adjusted based on the FP format type, e.g., FP32, FP8, etc.

Referring now to FIG. 1, an activation function and linear approximation of the activation function according to one aspect of the present embodiments is shown. The activation function in this nonlimiting example is a sigmoid activation function 110 for illustration purposes and is not limited thereto. For example, any kind of activation function may be used.

In this nonlimiting example, the sigmoid activation function 110 may be divided into a plurality of regions. For example, the positive range of the sigmoid activation function 110 may be divided into three regions, positive linear approximation region 120, positive piecewise linear approximation region 130, and positive linear approximation region 140, based on the first demarcation value 102 and the second demarcation value 104. In one nonlimiting example, the first demarcation value 102 and the second demarcation value 104 are based on biased exponents of FP16 format type that define the positive linear approximation region 120, positive piecewise linear approximation region 130, and positive linear approximation region 140. According to one nonlimiting example, the demarcation values 102 and 104 are selected that align with the floating point numbers having a mantissa of 0 and represented by its exponent. In some embodiments, as described herein, biased exponents may be used to simplify operations. For example, the first demarcation value 102 of ⅛ and the second demarcation value 104 of 8 have mantissa of 0 in FP16 format type and have a biased exponents of 12 and 18 respectively. In other words, the demarcation points 102 and 104 may be biased exponents in FP16. It is appreciated that the positive linear approximation region 120 may be the region between 0 and the first demarcation value 102, the positive piecewise linear approximation region 130 is the region between the first demarcation value 102 and the second demarcation value 104, and the positive linear approximation region 140 is the region that is greater than the second demarcation value 104. In this nonlimiting example, the positive linear approximation region 120 may be approximated with a single linear approximation, e.g., a line with an offset and a slope. Similarly, the positive linear approximation region 140 may be approximated with a single linear approximation, e.g., a line with an offset and a slope. However, the positive piecewise linear approximation region 130 includes a plurality of subregions and each subregion may be approximated using a linear approximation, e.g., a line with an offset and a slope (described in greater detail in FIG. 2 below).

It is appreciated that the first demarcation value 102 and the second demarcation value 104 may be dynamically adjusted, thereby changing the positive linear approximation region 120, the positive piecewise linear approximation region 130, and/or the positive linear approximation region 140. For example, increasing the first demarcation value 102 increases the region associated with the positive linear approximation region 120 while the region associated with the positive piecewise linear approximation region 130 is reduced. As yet another example, increasing the second demarcation value 104 reduces the region associated with the positive linear approximation region 140 while the region associated with the positive piecewise linear approximation region 130 is increased. It is appreciated that the first demarcation value 102 may be reduced to approximately zero in order to form two regions, the positive piecewise linear approximation region 130 and the positive linear approximation region 140. In one example, the first demarcation value 102 and/or second demarcation value 104 are user adjustable or may be determined by a processor and/or compiler. For example, a compiler that compiles high-level instructions into low-level instructions may make decisions regarding the value of first demarcation value 102 and/or second demarcation value 104 during a profiling stage. It is appreciated that the dynamic adjustment of the first and the second demarcation values 102 and 104 may modify the regions based on the characteristics of the activation function, available table size and the observed errors. It is appreciated that unique demarcation values for each activation function may be used and adjusted accordingly based on the characteristics of the activation function, available table size, and/or the observed errors.

In one nonlimiting example, the compiler, at the profiling stage, may generate a code to perform one or more ML operations with respect to the activation function of a particular layer for execution by an accelerator (ML hardware) for illustrative purposes that should not be construed as limiting the scope of the embodiments. For example, the compiler may generate a code for execution by a general processing unit (CPU), a field programmable gate array (FPGA), an application specific integrated circuit (ASIC), graphics pipeline unit (GPU), ML hardware, etc. The profiling stage may include the process of analyzing and examining the data used to train a model, identifying patterns, identifying inconsistencies and other issues to ensure suitability of the data in order to generate a reliable model. The compiler may also receive an instruction and/or metadata associated therewith and generate one or more low-level instructions such as a binary code or an instruction set architecture (ISA) instruction for execution by a processor or an accelerator such as a ML hardware. Although an ISA instruction is used as a nonlimiting example of the low-level instruction format to illustrate the proposed approach in the embodiments described below, it is appreciated that the same or similar approach is equally applicable to other types of low-level instructions. The compiler, during the profiling stage, may determine the quantization format type, e.g., int8, uint8, etc., of the input data and output data of the activation function (i.e., quantization format type input to the layer and output from the layer.

In general, the compiler is configured to go through multiple levels or stages during compilation of high-level code into low-level executable instructions on a hardware. At each level (i.e. stage), the compiler needs to make one or more decisions on compilation, e.g., how to map the data to be processed and to which memory blocks, decision on a particular processing tile to execute the executable code for a particular data, etc. At each level, the compiler in addition to generating the low-level executable code may also generate multi-layered structured metadata for that stage that reflects the action(s)/decision(s) being made by the compiler, e.g., mapping of data to memory blocks, precision, quantization, processing tile to perform a particular task/instruction, dimension reordering, copying across processing tiles, etc. It is appreciated that the compiler action(s)/decision(s) occur first in order for the high-level code to be compiled into low-level executable instructions.

Once the respective values for the first demarcation value 102 and/or second demarcation value 104, linear approximation values associated with each region, e.g., the positive linear approximation region 120, the piecewise linear approximation region 130, and the positive linear approximation region 140, are stored in a table (e.g., lookup table) for later use (as described in greater detail in FIGS. 2-3). According to some embodiments, the demarcation points (first, second, third, and fourth) may be determined prior to the compilation or may be finetuned by the compiler. It is appreciated that each activation function may have its own unique corresponding lookup table. In other words, in a ML model with hundreds or thousands of activations functions, hundreds or thousands of unique lookup tables may be generated (one unique lookup table for each activation function). As such, during runtime, when a particular activation function is activated, the input value may be used by the compiler to calculate/determine the index associated with the input value to fetch its corresponding output value, as described in greater detail in FIGS. 2-3 below. Accordingly, performing one or more ML operations associated with the activation function is reduced to looking up a value from a table, during runtime, thereby reducing latencies associated with the processing.

It is appreciated that the negative regions of the sigmoid activation function 110 may similarly be divided into a plurality of regions. For example, the negative range of the sigmoid activation function 110 may be divided into three regions, negative linear approximation region 150, negative piecewise linear approximation region 160, and negative linear approximation region 170, based on the third demarcation value 106 and the fourth demarcation value 108. It is appreciated that the third demarcation value 106 and the fourth demarcation value 108 refers to minimum and maximum of the absolute value of the negative values. In one nonlimiting example, the third demarcation value 106 and the fourth demarcation value 108 are based on biased exponents of FP16 format type that define the negative linear approximation region 150, negative piecewise linear approximation region 160, and negative linear approximation region 170. According to one nonlimiting example, the demarcation values 106 and 108 are selected that align with the floating point numbers having a mantissa of 0 and represented by its exponent. In some embodiments, as described herein, biased exponents may be used to simplify operations. For example, the third demarcation value 106 of $-\frac{1}{8}$ and the fourth demarcation value 108 of $-8$ have mantissa of 0 in FP16 format type and have a biased exponents of $-12$ and $-18$ respectively. It is appreciated that the biased exponents associated with the third and the fourth demarcation points 106 and 108 may be expressed as an absolute value.

It is appreciated that the negative linear approximation region 150 may be the region between 0 and the third demarcation value 106, the negative piecewise linear approximation region 160 is the region between the third demarcation value 106 and the fourth demarcation value 108, and the negative linear approximation region 170 is the region that is greater than the fourth demarcation value 108. In this nonlimiting example, the negative linear approximation region 150 may be approximated with a single linear approximation, e.g., a line with an offset and a slope. Similarly, the negative linear approximation region 170 may be approximated with a single linear approximation, e.g., a line with an offset and a slope. However, the negative piecewise linear approximation region 160 includes a plurality of subregions and each subregion may be approximated using a linear approximation, e.g., a line with an offset and a slope (described in greater detail in FIG. 2 below).

It is appreciated that the third demarcation value 106 and the fourth demarcation value 108 may be dynamically adjusted, thereby changing the negative linear approximation region 150, the negative piecewise linear approximation region 160, and/or the negative linear approximation region 170. For example, increasing the third demarcation value 106 increases the region associated with the negative linear approximation region 150 while the region associated with the negative piecewise linear approximation region 160 is reduced. As yet another example, increasing the fourth demarcation value 108 reduces the region associated with the negative linear approximation region 170 while the region associated with the negative piecewise linear approximation region 160 is increased. It is appreciated that the third demarcation value 106 may be reduced to approximately zero in order to form two regions, the negative piecewise linear approximation region 160 and the positive linear approximation region 170. In one example, the third demarcation value 106 and/or fourth demarcation value 108 are user adjustable or may be determined by a processor and/or compiler. For example, a compiler that compiles high-level instructions into low-level instructions may make decisions regarding the value of third demarcation value 106 and/or fourth demarcation value 108 during a profiling stage, as described above. It is appreciated that the dynamic adjustment of the third and the fourth demarcation values 106 and 108 may modify the regions based on the characteristics of the activation function, available table size and the observed errors. It is appreciated that unique demarcation values for each activation function may be used and adjusted accordingly based on the characteristics of the activation function, available table size, and/or the observed errors.

Figure 2:
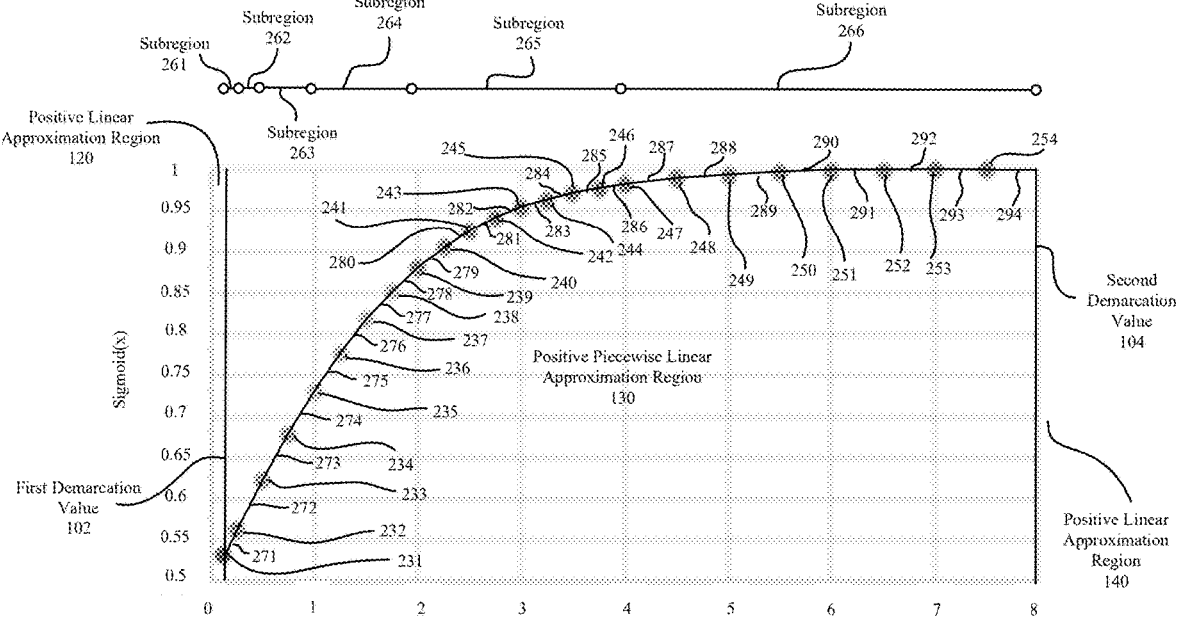
FIG. 2 shows processing associated with the positive piecewise linear approximation region 130, according to one aspect of the present embodiments.

Referring now FIG. 2, processing associated with the positive piecewise linear approximation region 130, according to one aspect of the present embodiments is shown. It is appreciated that the positive piecewise linear approximation region is discussed but the negative piecewise linear approximation region 160 is treated similar to that of the positive piecewise linear approximation region.

In this nonlimiting example, the positive piecewise linear approximation region 130 has been divided into six subregions 261-266. Each subregion may have one or more linear approximation associated therewith. For example, subregion 261 is defined by linear approximation 271, e.g., D*x+B, where a base (B) (also referred to as the offset) and slope (D) values are used to approximate the output of the sigmoid(x) when x falls within the subregion 261 (i.e., x-values between points 231-232 of the sigmoid(x) function). In other words, storing the slope and the offset associated with the linear approximation 271, in a lookup table, can be used to approximate the activation function sigmoid(x) when x falls within the subregion 261 by performing a linear function calculation and as such the sigmoid(x) function does not need to be processed to obtain the output result. Storing the offset and the slope for each linear approximation in a memory as a table is described in greater detail in FIG. 3.

Similar to subregion 261, subregion 262 is defined by its respective linear approximation 272, e.g., D*x+B, to approximate the output of the sigmoid(x) when x falls within the subregion 262 (i.e., x-values between points 232-233 of the sigmoid(x) function). In other words, storing the slope and the offset associated with the linear approximation 272, in a lookup table, can be used to approximate the activation function sigmoid(x) when x falls within the subregion 262 by performing a linear function calculation and as such the sigmoid(x) function does not need to be processed to obtain the output result.

Subregion 263 in this nonlimiting example is defined by more than one linear approximation, e.g., 2 linear approximations. In this nonlimiting example, the first linear approximation of subregion 263 is linear approximation 273 and the second linear approximation of subregion 263 is linear approximation 274 where each is approximated using its respective offset and slope. Each linear approximations 273 and 274 approximate the output of the sigmoid(x) when x falls within the subregion 263 (i.e., x-values between points 233-235 of the sigmoid(x) function). It is appreciated that linear approximation 273 is used if x is between points 233-234 and linear approximation 274 is used if x is between points 234-235. In other words, storing the slope and the offset associated with the linear approximations 273-274, in a lookup table, can be used to approximate the activation function sigmoid(x) when x falls within the subregion 263 by performing a linear function calculation and as such the sigmoid(x) function does not need to be processed to obtain the output result. It is appreciated that the number of linear approximations in each subregion may be determined by the user or by a processor/compiler, e.g., during the profiling stage.

Subregion 264 in this nonlimiting example is defined by more than one linear approximation, e.g., 4 linear approximations. In this nonlimiting example, the first linear approximation of subregion 264 is linear approximation 275, the second linear approximation of subregion 264 is linear approximation 276, the third linear approximation of subregion 264 is linear approximation 277, and the fourth linear approximation of subregion 264 is linear approximation 278, where each is approximated using its respective offset and slope. Each linear approximations 275-278 approximate the output of the sigmoid(x) when x falls within the subregion 264 (i.e., x-values between points 235-238 of the sigmoid(x) function). It is appreciated that linear approximation 275 is used if x is between points 235-236, linear approximation 276 is used if x is between points 236-237, linear approximation 277 is used if x is between points 237-238, and linear approximation 278 is used if x is between points 238-239. In other words, storing the slope and the offset associated with the linear approximations 275-278, in a lookup table, can be used to approximate the activation function sigmoid(x) when x falls within the subregion 264 by performing a linear function calculation and as such the sigmoid(x) function does not need to be processed to obtain the output result. It is appreciated that the number of linear approximations in each subregion may be determined by the user or by a processor/compiler, e.g., during the profiling stage.

Subregion 265 in this nonlimiting example is defined by more than one linear approximation, e.g., 8 linear approximations. In this nonlimiting example, the first linear approximation of subregion 265 is linear approximation 279, the second linear approximation of subregion 265 is linear approximation 280, the third linear approximation of subregion 265 is linear approximation 281, the fourth linear approximation of subregion 265 is linear approximation 282, the fifth linear approximation of subregion 265 is linear approximation 283, the sixth linear approximation of subregion 265 is linear approximation 284, the seventh linear approximation of subregion 265 is linear approximation 285, and the eighth linear approximation of subregion 265 is linear approximation 286 where each is approximated using its respective offset and slope. Each linear approximations 279-286 approximates the output of the sigmoid(x) when x falls within the subregion 265 (i.e., x-values between points 239-247 of the sigmoid(x) function). It is appreciated that linear approximation 279 is used if x is between points 239-240, linear approximation 280 is used if x is between points 240-241, linear approximation 281 is used if x is between points 241-242, linear approximation 282 is used if x is between points 242-243, linear approximation 283 is used if x is between points 243-244, linear approximation 284 is used if x is between points 244-245, linear approximation 285 is used if x is between points 245-246, and linear approximation 286 is used if x is between points 246-247. In other words, storing the slope and the offset associated with the linear approximations 279-286, in a lookup table, can be used to approximate the activation function sigmoid(x) when x falls within the subregion 265 by performing a linear function calculation and as such the sigmoid(x) function does not need to be processed to obtain the output result. It is appreciated that the number of linear approximations in each subregion may be determined by the user or by a processor/compiler, e.g., during the profiling stage.

Subregion 266 in this nonlimiting example is defined by more than one linear approximation, e.g., 8 linear approximations. In this nonlimiting example, the first linear approximation of subregion 266 is linear approximation 287, the second linear approximation of subregion 266 is linear approximation 288, the third linear approximation of subregion 266 is linear approximation 289, the fourth linear approximation of subregion 266 is linear approximation 290, the fifth linear approximation of subregion 266 is linear approximation 291, the sixth linear approximation of subregion 266 is linear approximation 292, the seventh linear approximation of subregion 266 is linear approximation 293, and the eighth linear approximation of subregion 266 is linear approximation 294 where each is approximated using its respective offset and slope. Each linear approximations 287-294 approximate the output of the sigmoid(x) when x falls within the subregion 266 (i.e., x-values between points 247-second demarcation value 104 of the sigmoid(x) function). It is appreciated that linear approximation 287 is used if x is between points 247-248, linear approximation 288 is used if x is between points 248-249, linear approximation

289 is used if x is between points 249-250, linear approximation 290 is used if x is between points 250-251, linear approximation 291 is used if x is between points 251-252, linear approximation 292 is used if x is between points 252-253, linear approximation 293 is used if x is between points 253-254, and linear approximation 294 is used if x is between points 254 and the second demarcation value 104. In other words, storing the slope and the offset associated with the linear approximations 287-294, in a lookup table, can be used to approximate the activation function sigmoid (x) when x falls within the subregion 266 by performing a linear function calculation and as such the sigmoid(x) function does not need to be processed to obtain the output result. It is appreciated that the number of linear approximations in each subregion may be determined by the user or by a compiler running on a processor, e.g., during the profiling stage.

Figure 3:
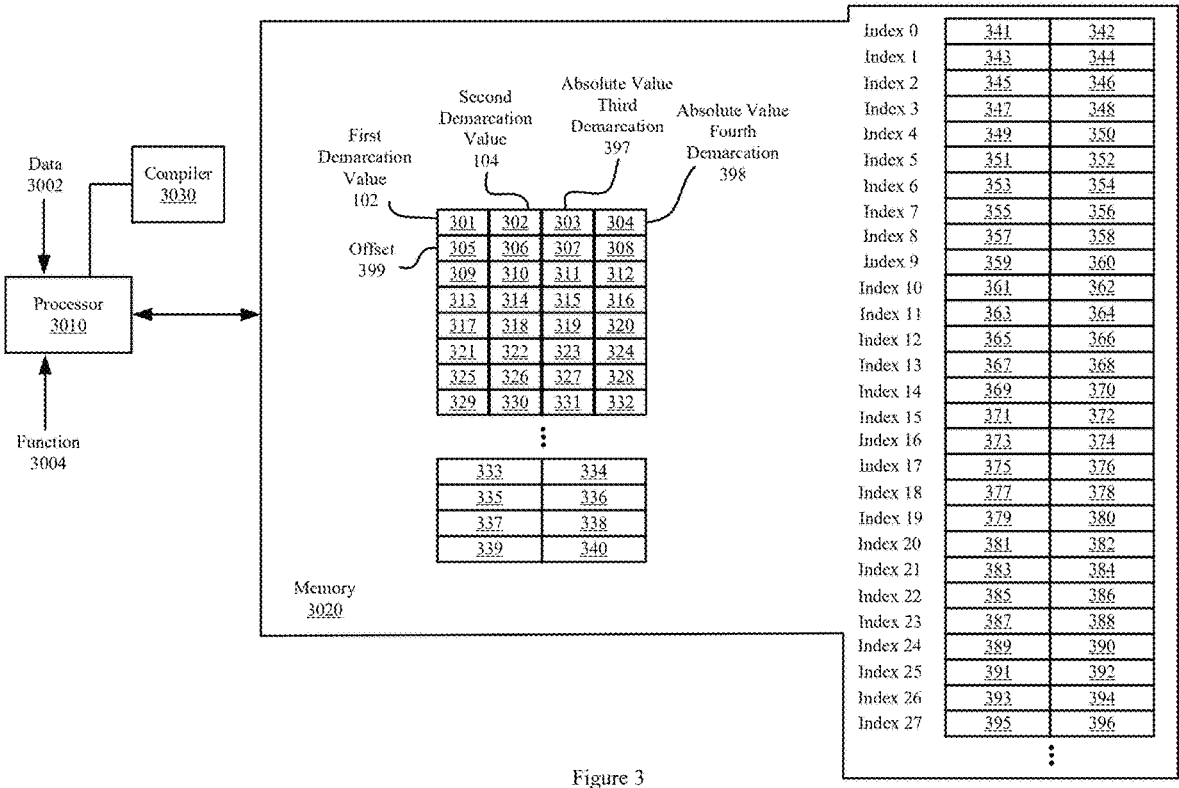
FIG. 3 shows storing approximation values associated with each linear approximation according to one aspect of the embodiments.
Figure 4A:
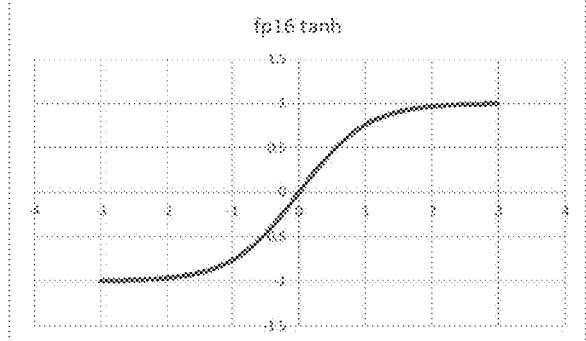
FIGS. 4A-4F show a comparison of error between the FP16 approximation, as described above, of different activation functions with FP32 as a reference.
Figure 4A:
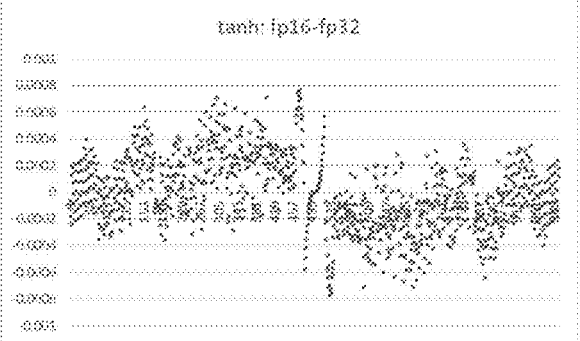
Figure 4B:
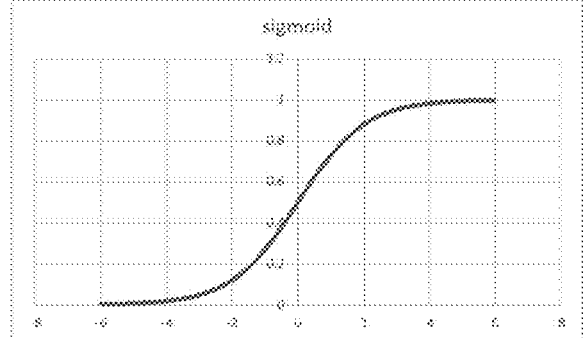
Figure 4B:
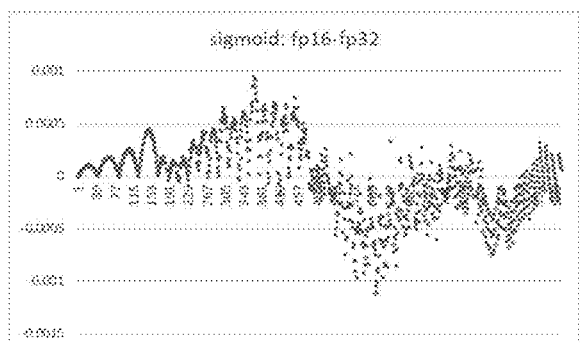
Figure 4C:
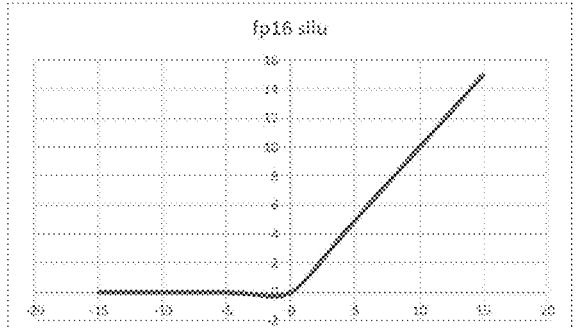
Figure 4C:
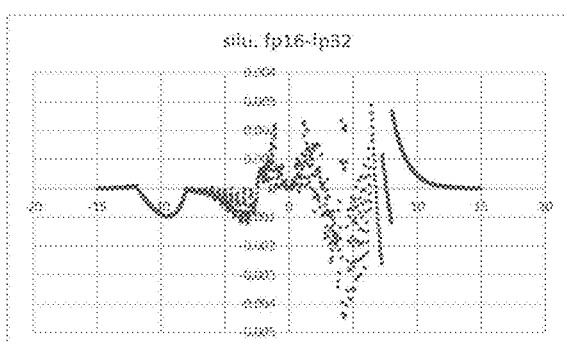
Figure 4D:
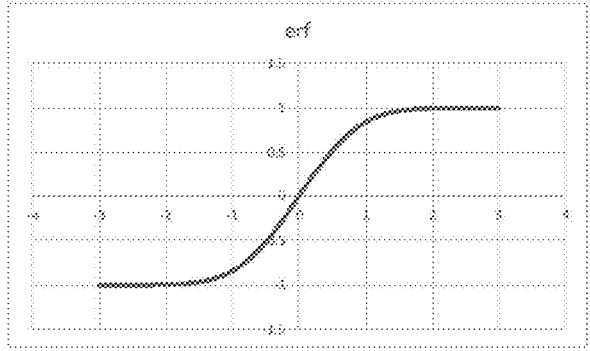
Figure 4D:
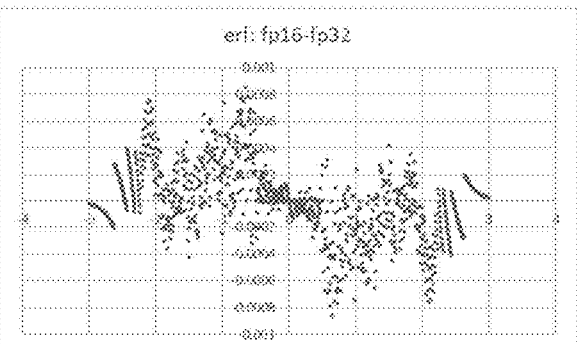
Figure 4E:
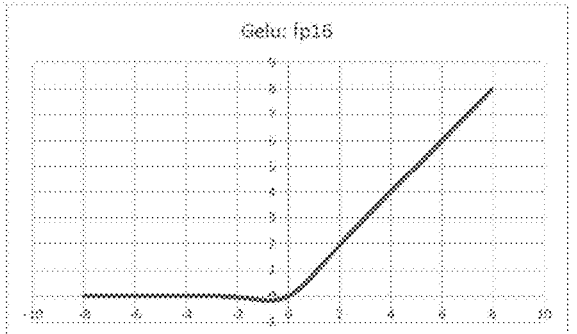
Figure 4E:
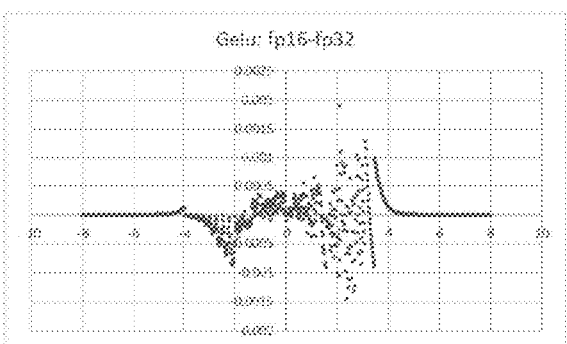
Figure 4F:
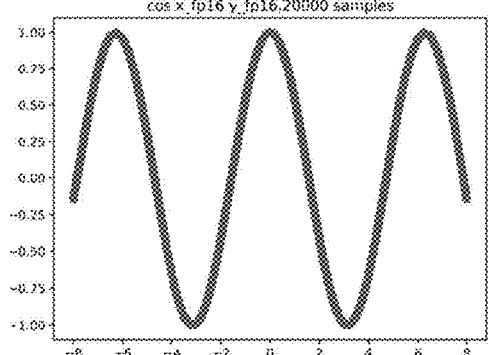
Figure 4F:
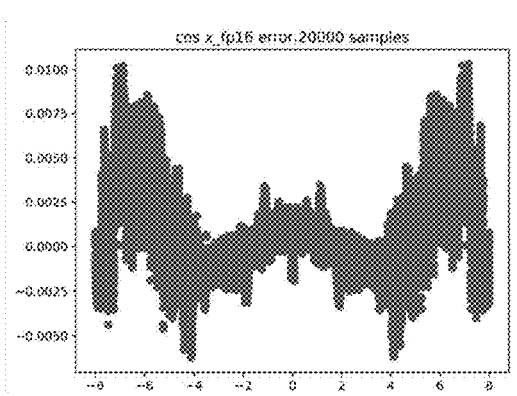

Referring now to FIG. 3, storing approximation values associated with each linear approximation according to one aspect of the embodiments is shown. In this nonlimiting example, the activation function 110 has been divided into its linear approximation regions, e.g., positive and negative, and piecewise linear approximation regions, e.g., positive piecewise linear approximation region and negative piecewise linear approximation region, as described in FIG. 2. It is appreciated that the approximation values, e.g., offset and slope, associated with each linear approximation region may be received by a processor 3010 as data 3002 along with function 3004, e.g., activation function such as sigmoid 110. The processor 3010 is coupled to a memory 3020 and is configured to store the approximation values in the memory 3020, as described below. The data 3002 may also include the first demarcation value 102, the second demarcation value 104, the third demarcation value 106 (which is an absolute value number), and the fourth demarcation value 108 (which is an absolute value number).

It is appreciated that one or more components of the system may run on one or more computing units or devices (not shown) each with software instructions stored in a storage unit such as a non-volatile memory of the computing unit for practicing one or more processes. When the software instructions are executed, at least a subset of the software instructions is loaded into memory by one of the computing units, which becomes a special purposed one for practicing the processes. The processes may also be at least partially embodied in the computing units into which computer program code is loaded and/or executed, such that, the computing units become special purpose computing units for practicing the processes. For nonlimiting examples, a compiler 3030 running on the processor 3010 may take certain actions and make certain decisions to reduce one or more of data movement, data conversions, storage usage, computation (or duplication of computation), and communication (by duplicating compute if beneficial), etc. The ML hardware may be a dedicated hardware including one or more microprocessors and/or on-chip memory (OCM) units storing the data and/or the set of low-level instructions compiled from the high-level code by the compiler to perform one or more ML operations. At runtime, the ML hardware is configured to retrieve the set of low-level instructions and/or data from the compiler and execute the set of low-level instructions to perform the one or more ML operations according to the set of low-level instructions. For a nonlimiting example, the ML-specific hardware can be but is not limited to an inference engine, which is configured to infer and identify a subject via an inference operation from data input according to the ML network model.

In this nonlimiting example, the data 3002 may be a floating point (FP), e.g., FP4, FP8, FP16, FP32, FP9, brain FP16 (BFP16), etc. For illustration purposes, FP16 is used. FP16 data includes one sign bit followed by 5 exponent bits, and 10 mantissa bits. According to one nonlimiting example, the processor 3010 may use biased exponents associated with the first demarcation value 102, second demarcation value 104, minimum absolute negative value 397 (absolute value for third demarcation value 106), and maximum absolute negative value 398 (absolute value for fourth demarcation value 108). It is appreciated that the first demarcation value 102 and the second demarcation value 104 can be used to define the positive piecewise linear approximation region, as described above. Moreover, it is appreciated that the minimum absolute negative value 397 and the maximum absolute negative value 398 can be used to define the negative piecewise linear approximation region, as described above. It is appreciated that the linear approximation regions 120, 140, 150, and 170 may be defined by areas that do not fall within the range as defined by piecewise linear approximation regions (positive and negative). For illustration purposes, it is assumed that the first demarcation value 102 is ⅛. As such, the biased exponent for the first demarcation value 102 is 12 and is stored in memory location 301. The memory location 301 may be 4 bytes long. For illustration purposes, it is assumed that the second demarcation value 104 is 8. As such, the biased exponent for the second demarcation value 104 is 18 and is stored in memory location 302. The memory location 302 may be 4 bytes long. For illustration purposes, it is assumed that the third demarcation value 106 is −12 (biased exponent) that corresponds to −⅛ on the x-axis, thereby the absolute value third demarcation 397 being 12. As such, the absolute value third demarcation value 106 is 12 and is stored in memory location 303. The memory location 303 may be 4 bytes long. For illustration purposes, it is assumed that the fourth demarcation value 108 is −18 (biased exponent), thereby the fourth absolute demarcation value 398 being 18. As such, the absolute value fourth demarcation 398 is 18 and is stored in memory location 304. The memory location 302 may be 4 bytes long.

It is appreciated that in one nonlimiting example, the memory 3020 may include two segments. The first segment may be memory locations 301-332 and the second segment may be memory locations 333-396. In the first segment of 3020, in memory location 305, and offset 399 is stored. The offset 399 determines the number of bytes in the first segment that should be skipped to move from information associated with positive piecewise linear approximations to negative piecewise linear approximations, as described in greater detail below. In one nonlimiting example, the memory location 105 is 4 bytes long. According to some embodiments, the memory locations 306-308 may be reserved.

The processor 3010 is configured to store indices data associated with subregions in the first segment of the memory 3020. For example, index data associated with subregion 261 may be stored in the memory locations 309-310. The index data in memory location 309 may indicate the index associated with the subregion and here since subregion 261 is the first subregion, then the value 0 is stored in memory location 309 to reflect index 0. In memory location 310, a number of linear approximations within the subregion 261 is stored. In the example of FIG. 2, since there is only one linear approximation 271, then the value stored in the memory location 310 is 0 because 2° is 1, indicating that there is one linear approximation 271 within the subregion 261.

Similarly, the processor 3010 is configured to store indices data associated with subregion 262 in memory locations 311-312. In this nonlimiting example, since the index 0 has been used for mapping the linear approximation 271 to the subregion 261, the index value of 1 reflects the first linear approximation within the subregion 262. Similar to subregion 261, subregion 262 also has only one linear approximation 272, and as such the value stored in the memory location 312 is 0 because 2° is 1, indicating that there is one linear approximation 272 within the subregion 262.

The processor 3010 advances from index 1 to starting index 2 for subregion 263 and stores a value 2 in the memory address 313. The value 2 reflects the index value associated with the first linear approximation within the subregion 263. Unlike subregions 261 and 262, subregion 263 includes 2 linear approximations 273-274. As such, a value 1 is stored in the memory location 314 to reflect $2^1$ number of linear approximations are present in the subregion 263. As such, the index value associated with the first linear approximation 273 is 2 and the index value associated with the second linear approximation 274 is 3. The next index is 4, which is mapped to the first linear approximation 275 of subregion 264. The index 4 is stored by the processor 3010 in the memory location 315. As described above and for illustrative purposes, the subregion 264 includes 4 linear approximations. As such, a value 2 is stored in the memory location 316 to reflect $2^2$ number of linear approximations within the subregion 264. The index 4 is mapped to the linear approximation 275, index 5 is mapped to the linear approximation 276, index 6 is mapped to the linear approximation 277, and index 7 is mapped to the linear approximation 278.

The next index is value 8 reflecting the index associated with the first linear approximation 279 of the subregion 265. Accordingly, the processor 3010 stores the value 8 in the memory location 317 to map the index 8 to the linear approximation 279 within the subregion 265. As described above for illustrative purposes, the subregion 265 includes 8 linear approximations 279-286. As such, value 3 to reflect 23 number of linear approximations is stored by the processor 3010 in the memory location 318. The index value 9 is therefore mapped to linear approximation 280, index value 10 is mapped to linear approximation 281, index value 11 is mapped to linear approximation 282, index value 12 is mapped to linear approximation 283, index value 13 is mapped to linear approximation 284, index value 14 is mapped to linear approximation 285, and index value 15 is mapped to linear approximation 286.

The next index value is 16 reflecting the index associated with the first linear approximation 387 of the subregion 266. Accordingly, the processor 3010 stores the value 8 in the memory location 319 to map the index 16 to the linear approximation 387 within the subregion 266. As described above for illustrative purposes, the subregion 266 includes 8 linear approximations 287-294. As such, value 3 to reflect 23 number of linear approximations is stored by the processor 3010 in the memory location 320. The index value 17 is therefore mapped to linear approximation 288, index value 18 is mapped to linear approximation 289, index value 19 is mapped to linear approximation 290, index value 20 is mapped to linear approximation 291, index value 21 is mapped to linear approximation 292, index value 22 is mapped to linear approximation 293, and index value 23 is mapped to linear approximation 294. It is appreciated that since all linear approximation of the subregions of the positive piecewise linear approximation region 130 have been indexed, the processor 3010 may proceed with repeating a similar process with respect to the negative piecewise linear approximation region 160.

In this nonlimiting example, the next index is 24 and is stored in the memory location 321 associated with the first linear approximation within the first subregion of the negative piecewise approximation region 160. It is appreciated that the process may continue similar to before. For illustrative purposes, it is presumed that the negative piecewise linear approximation region 160 is divided similar to the positive piecewise linear approximation 120. However, it is appreciated that the negative piecewise linear approximation region 160 may be divided differently from that on the positive side. In this nonlimiting example, the first and the second subregions of the negative piecewise linear approximation region 160, each have one linear approximation each whereas the third subregion of the negative piecewise linear approximation region 160 has 2 linear approximations, the fourth subregion of the negative piecewise linear approximation region 160 has 4 linear approximations, and the fifth and the sixth subregions of the negative piecewise linear approximation region 160, each have 8 linear approximations for illustrative purposes. Accordingly, the index values (starting index) for each subregion and the number of linear approximations within each region is stored similar to that of the positive piecewise linear approximation region 120. In this example, index value 24 may be stored in the memory location 321, and value 0 may be stored in the memory location 322 to reflect only one linear approximation. The index is updated to 25 and is stored by the processor 3010 in memory location 323. Value 0 may be stored by the processor 3010 in memory location 324 to reflect only one linear approximation in the second subregion. The index is updated to 26 and is stored in the memory location 325 to map to the first linear approximation in the third subregion. The third subregion may include 2 linear approximations and as such a value 1 is stored in the memory location 326. The index is updated to 28 to map to the first linear approximation within the fourth subregion and is stored by the controller 3010 in memory location 327. The fourth subregion includes 4 linear approximations and as such a value 2 is stored in the memory location 328. The index is updated to 32 to map to the first linear approximation of the fifth subregion. The value 32 is stored in the memory location 329. The fifth subregion includes 8 linear approximations and as such a value 3 is stored in the memory location 330. The index value is updated to 40 and the value is stored by the processor 3010 in memory location 331 to map to the first linear approximation within the sixth subregion. The sixth subregion includes 8 linear approximations and as such a value 3 is stored in the memory location 332. The index value is updated, and the process is repeated until all linear approximations within each subregion are accounted for.

According to one nonlimiting example, the offset 399 is a value 20 to reflect the number of bytes that should be skipped after the memory location 301 to access information associated with the negative piecewise linear approximation region 160.

It is appreciated that memory locations 301-332 may be 4-bytes long each and may store a number that has a uint8 format type. According to some nonlimiting examples, the processor 3010 may store the offset and slope value associated with the linear approximation for the positive linear approximation region 120, in the memory locations 333 and 334. The processor 3010 may store the offset and slope value associated with the linear approximation for the positive linear approximation region 140, in the memory locations 335 and 336. The processor 3010 may store the offset and slope value associated with the linear approximation for the negative linear approximation region 150, in the memory locations 337 and 338. The processor 3010 may store the offset and slope value associated with the linear approximation for the negative linear approximation region 170, in the memory locations 339 and 340. It is appreciated that memory locations 333-396 may be a second segment of the memory 3020 and may store a floating point value, e.g., FP16. It is appreciated that the activation table as described is 4-bytes in width associated with FP16 where the offset is 2-bytes in width and the slope is 2-bytes in width. It is appreciated that the size of the activation table may be adjusted, as needed, based on the precision, e.g., FP32, FP8, etc.

The processor 3010 is configured to store the slope and the offset associated with each linear approximation within the piecewise linear approximation regions (positive and negative). In this nonlimiting example, the processor 3010 stores the slope and the offset associated with the linear approximation 271 in memory locations 341-342 respectively and associates that with index 0 as identified by memory locations 309-310. The processor 3010 stores the slope and the offset associated with the linear approximation 272 in memory locations 343-344 respectively and associates it with index 1 as identified by memory locations 311-312. The processor 3010 stores the slope and the offset associated with the linear approximation 273 in memory locations 345-346 respectively associated with index 2 as determined by data stored in memory locations 313-314, and linear approximation 274 in memory locations 347-348 respectively associated with index 3 as determined by data stored in memory locations 313-314.

The processor 3010 stores the slope and the offset associated with the linear approximation 275 in memory locations 349-350 respectively associated with index 4 as determined by data stored in memory locations 315-316. Similarly, the processor 3010 stores the slope and the offset associated with the linear approximation 276 in the memory locations 351-352 respectively associated with index 5 as determined by data stored in memory locations 315-316. The processor 3010 stores the slope and the offset associated with the linear approximation 277 in the memory locations 353-354 respectively associated with index 6 as determined by data stored in memory locations 315-316. The processor 3010 stores the slope and the offset associated with the linear approximation 278 in the memory locations 355-356 respectively associated with index 7 as determined by data stored in memory locations 315-316.

The processor 3010 stores the slope and the offset associated with the linear approximation 279 in memory locations 357-358 respectively associated with index 8 as determined by data stored in memory locations 317-318. Similarly, the processor 3010 stores the slope and the offset associated with the linear approximation 280 in the memory locations 359-360 respectively associated with index 9 as determined by data stored in memory locations 317-318. The processor 3010 stores the slope and the offset associated with the linear approximation 281 in the memory locations 361-362 respectively associated with index 10 as determined by data stored in memory locations 317-318. The processor 3010 stores the slope and the offset associated with the linear approximation 282 in the memory locations 363-364 respectively associated with index 11 as determined by data stored in memory locations 317-318. The processor 3010 stores the slope and the offset associated with the linear approximation 283 in the memory locations 365-366 respectively associated with index 12 as determined by data stored in memory locations 317-318. The processor 3010 stores the slope and the offset associated with the linear approximation 284 in the memory locations 367-368 respectively associated with index 13 as determined by data stored in memory locations 317-318. The processor 3010 stores the slope and the offset associated with the linear approximation 285 in the memory locations 369-370 respectively associated with index 14 as determined by data stored in memory locations 317-318. The processor 3010 stores the slope and the offset associated with the linear approximation 286 in the memory locations 371-372 respectively associated with index 15 as determined by data stored in memory locations 317-318.

The processor 3010 stores the slope and the offset associated with the linear approximation 287 in memory locations 373-374 respectively associated with index 16 as determined by data stored in memory locations 319-320. Similarly, the processor 3010 stores the slope and the offset associated with the linear approximation 288 in the memory locations 375-376 respectively associated with index 17 as determined by data stored in memory locations 319-320. The processor 3010 stores the slope and the offset associated with the linear approximation 289 in the memory locations 377-378 respectively associated with index 18 as determined by data stored in memory locations 319-320. The processor 3010 stores the slope and the offset associated with the linear approximation 290 in the memory locations 379-380 respectively associated with index 19 as determined by data stored in memory locations 319-320. The processor 3010 stores the slope and the offset associated with the linear approximation 291 in the memory locations 381-382 respectively associated with index 20 as determined by data stored in memory locations 319-320. The processor 3010 stores the slope and the offset associated with the linear approximation 292 in the memory locations 383-384 respectively associated with index 21 as determined by data stored in memory locations 319-320. The processor 3010 stores the slope and the offset associated with the linear approximation 293 in the memory locations 385-386 respectively associated with index 22 as determined by data stored in memory locations 319-320. The processor 3010 stores the slope and the offset associated with the linear approximation 294 in the memory locations 387-388 respectively associated with index 23 as determined by data stored in memory locations 319-320.

Subsequently, the processor 3010 stores the slope and offset values associated with each linear approximation of the negative piecewise linear approximation region 160 in the memory locations 389-396 and so forth that are associated with their respective index.

As illustrated, the values of the activation function, e.g., sigmoid function, may be stored in the memory 3020 as a lookup table. An input data, e.g., a floating point value, may be used by the processor to determine which portion of the memory 3020 is to be accessed in order to fetch the approximation values, e.g., slope and offset, in order to generate an output value for the received input. It is appreciated that the generated lookup table replaces a computationally intensive activation function with a lookup followed by processing of a linear function based on the fetched slope and offset. For illustration purposes, a floating point input value having an FP16 format type may be received by the processor 3010. The sign bit of the floating point input value may be used by the processor 3010 to determine whether the floating point input value is positive or negative.

If the value is positive, then the processor 3010 accesses the range for the positive piecewise linear approximation and uses the exponent bits (biased exponent) of the floating point input value to determine whether the floating point input value is within the positive piecewise linear approximation region 130 or not. If the floating point input value is not within the positive piecewise linear approximation region 130, then the processor 3010 determines whether the floating point input value is within the positive linear approximation region 120 or 140 and in response thereto fetches the values stored in memory locations 333-334 or values stored in memory locations 335-336. If the floating point input value is within the positive piecewise linear approximation region 130, then the processor 3010 uses the biased exponents of the input value to identify the subregion, e.g., subregions 261-266 with biased exponents of 12, 13, 14, 15, 16, and 17 respectively. It is appreciated that the biased exponent 18 is associated with the demarcation value associated with the end of the positive piecewise linear approximation. Subsequently, a subset of the mantissa of the floating point input value is used to identify the index associated with the floating point input value. For example, the top 4 significant bits of the mantissa for the floating point input value can identify up to $2^4$, which is 16 number of indices that reflect 16 approximations within a given subregion whereas the top 5 significant bits of the mantissa for the floating point input value can identify up to $2^5$, which is 32 number of indices that reflect 32 approximations within a given subregion. For illustration purposes, it may be determined based on the sign value, and the biased exponent value that the input value is within the subregion 264. Since the subregion 264 includes 4 different approximations, therefore the top two significant bits of mantissa may be used to determine the index associated with the subregion. Accordingly, one out of four estimations within the subregion 264 is identified and its approximation, e.g., slope and offset, may be fetched and used in linear approximation for the input value. As yet another example, it may be determined based on the sign value, and the biased exponent value that the input value is within the subregion 265. Since the subregion 265 includes 8 different approximations therefore the top three significant bits of mantissa may be used to determine the index associated with the subregion 265. Accordingly, one out of eight estimations within the subregion 265 is identified and its approximation, e.g., slope and offset, may be fetched and used in linear approximation for the input value. In this nonlimiting example, it is assumed that index 17 is determined based on the biased exponent and the subset of mantissa (top three significant bits of mantissa). As such, the processor 3010 fetches the slope and the offset associated with index 17 from memory locations 375-376 and uses those values to calculate the output of the linear approximation function 288 based on the floating point input value.

On the other hand, if the value is negative (e.g., sign bit used to determine whether the value is positive or negative), then the processor 3010 accesses the range for the negative piecewise linear approximation and uses the exponent bits (biased exponent) of the floating point input value to determine whether the floating point input value is within the negative piecewise linear approximation region 160 or not. If the floating point input value is not within the negative piecewise linear approximation region 160, then the processor 3010 determines whether the floating point input value is within the negative linear approximation region 150 or 170 and in response thereto fetches the values stored in memory locations 337-338 or values stored in memory locations 339-340. If the floating point input value is within the negative piecewise linear approximation region 160, then the processor 3010 uses the biased exponent of the input value to identify the negative subregion. Subsequently, a subset of the mantissa of the floating point input value is used to identify the index associated with the floating point input value. For example, the top 4 significant bits of the mantissa for the floating point input value can identify up to $2^4$, which is 16 number of indices that reflect 16 approximations within a given subregion whereas the top 5 significant bits of the mantissa for the floating point input value can identify up to $2^5$, which is 32 number of indices that reflect 32 approximations within a given subregion. It is appreciated that the biased exponent may be used to identify the subregion within the negative region and a subset of the mantissa bits may be used to identify the index within subregion, similar to that in the positive region as described above. For illustration purposes, it is assumed that index 26 is determined. As such, the processor 3010 fetches the slope and the offset associated with index 26 from memory locations 393-394 and uses those values to calculate the output of the linear approximation function based on the floating point input value.

As illustrated, a linear approximation based on the stored slope and offset that is fetched from a lookup table can be calculated to generate an output associated with an activation function instead of performing computationally complex calculations based on the activation function. Accordingly, the latency associated with the processing is reduced and processing speed is increased.

Below an example of a Python code directed to the embodiments is shown.

```
#March 2024
#exponent bias of fp16 is 15
#o biased exponent of 15 is equal to exp 0, x = 1
# 11 -> 1/16
# 12 -> 1/8
# 13 -> 1/4
# 14 -> 1/2
# 15 -> 1
# 16 -> 2
# 17 -> 4
# 18 -> 8
# 19 -> 16
# 20 -> 32
#define here the function for which a table needs to be created
def fp32_function(x):
    return (np.exp(2.*x) −1) / (no.exp(2.*x) + 1)
def build_table_v2( ):
    print("new function to build the table")
```

-continued

```
fname = "tanh"
print("fp16 table with ", tm.number supported meta data entries(fp16t), " meta data entries")
print("and ", tm.number supported BD entries(fp16t), " BD entries")
#manual step at this moment
#positive region 1
fp16t['D_p_ex_min_reg1'] = np.float16(1.)
fp16t['B_p_ex_min_reg1'] = np.float16(0.)
#positive region 2
fp16t['p_ex_min'] = 12
fp16t['p_ex_max'] = 17
#define each range (exponent, bit)
strategy positive = [(12,0), (13,2), (14,3), (15,4), (16,4)]
#positive region 3
fp16t['D_p_ex_max_reg3'] = np.float16(0.)
fp16t['B_p_ex_max_reg3'] = np.float16(1.)
#negative region 1
fp16t['D_n_ex_min_reg1'] = np.float16(1.)
fp16t['B_n_ex_min_reg1'] = np.float16(0.)
#negative region 2
fp16t['n_ex_min'] = 12
fp16t['n_ex_max'] = 17
#define each range (exponent, bit)
strategy negative = [(12,0), (13,2), (14,3), (15,4), (16,4)]
#negative region 3
fp16t['D_n_ex_max_reg3'] = np.float16(0)
fp16t['B_n_ex_max_reg3'] = np.float16(-1.)
#all other table data is generated automatically
#future strategy:
#running through all exponent ranges -/+ (1 - 29) as 30 is the last
#running through all piecewise sets (h0 - h5)
#build the fp16t for this region (only region 2), but general table can handle it
#run analysis using all 1024 mantissa values (man need new function for that - similar to the test
#capture the average and max error
#compare for the 6 cases (h0 - h5) , also look at the D and B values
#suggest which h to use
#after the loops , identify - lilely manual which min exp and max exp to use for positive and negative
side
#manualy determin the D/B for region 1 and 3 on positive and negative side
#run one more time with determend setting to get the D/B table entries
#build the meta data table based on the strategy, rest of code is fully automated
```

It is appreciated that the embodiments described above use a single table for both positive and negative range of an activation function for illustration purposes but should not be construed as limiting the scope of the embodiments. For example, one table may be generated for the positive range and another table may be generated for the negative and the need to account for offset 399 may be eliminated. It is also appreciated that the indices data stored in memory locations 309-332 is for illustrative purposes and should not be construed as limiting the scope of the embodiments. For example, an index may be stored in each memory location to map to its linear approximation, which may result in a larger table and more data being stored in the first segment by not storing the data in the condensed format (e.g., indicating the number of linear approximations within each subregion). Moreover, it is appreciated that the embodiments were described with respect to FP16 input values where the first demarcation value 102, the second demarcation value 104, the third demarcation value 106, the fourth demarcation value 108, etc., are stored as uint8 format type in the table and storing FP16 values for the offset and slope for illustration purposes and should not be construed as limiting the scope of the embodiments. In the examples provided in FIGS. 1-3, the first segment of the memory 3020 may be 64 bytes containing uint8 data long while the second segment of the memory 3020 may be 384 bytes containing FP16 data.

Referring now to FIGS. 4A-4F, a comparison of error between the FP16 approximation, as described above, of different activation functions with FP32 as a reference is shown for illustration purposes. As illustrated, the linear approximation according to the embodiments described above has low errors.

Figure 5:
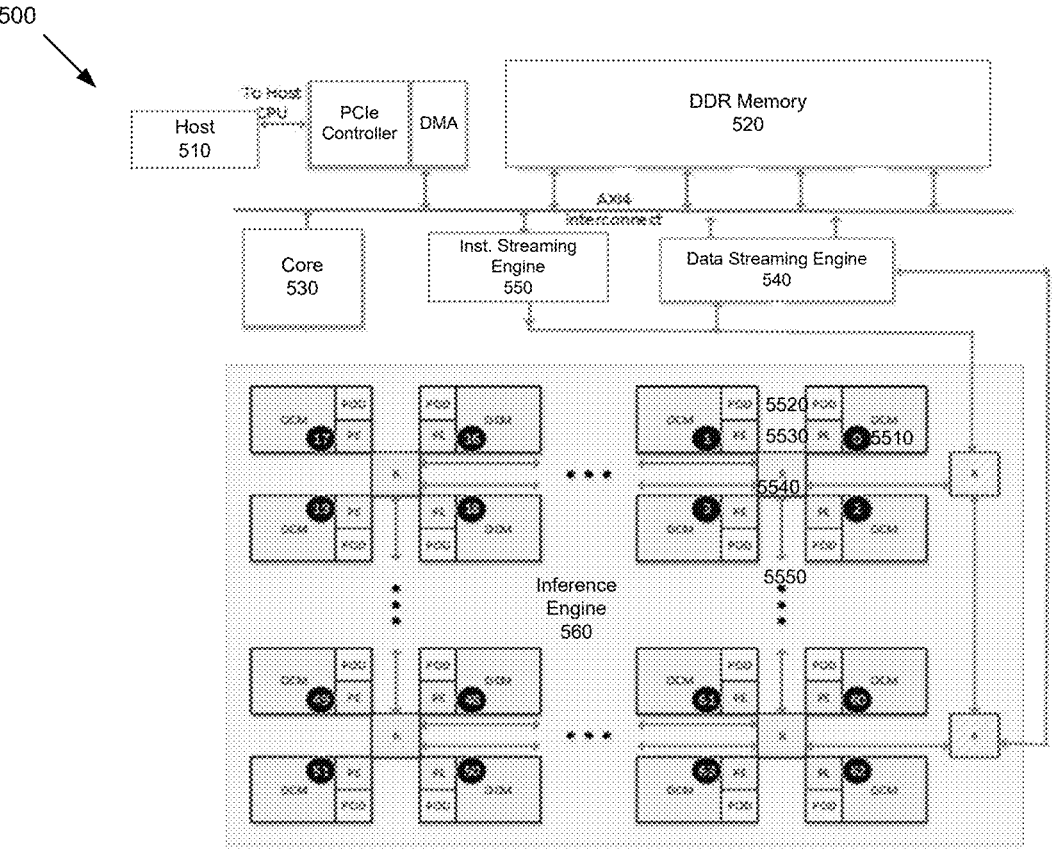
FIG. 5 shows an example of a diagram of a hardware-based programmable system/architecture 500 configured to support inference acceleration for machine learning according to one aspect of the embodiments.

FIG. 5 depicts an example of a diagram of a hardware-based programmable system/architecture 500 configured to support inference acceleration for machine learning. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

Each of the engines in the architecture 500 is a dedicated hardware block/component including one or more microprocessors and on-chip memory units storing software instructions programmed by a user for various machine learning operations. When the software instructions are executed by the microprocessors, each of the hardware components becomes a special purposed hardware component for practicing certain machine learning functions as discussed in detail below. In some embodiments, the architecture 500 is on a single chip, e.g., a system-on-chip (SOC).

The architecture 500 may include a host 510 coupled to a memory (e.g., DDR) 520 and a core engine 530 via a PCIe controller and/or a direct memory access (DMA) module. The host 510 is a processing unit configured to receive or generate data to be analyzed and/or inferred by architecture 500 via machine learning. The DDR memory 520 is coupled to a data streaming engine 540 configured to transfer/stream data between the DDR memory 520 and on-chip memory (OCM) 5510 of an inference engine 560 discussed below via DMA (DDR-to-OCM DMA or DoD). The core 530 is a processing engine configured to receive and interpret a plurality of ML commands from the host 510 into instructions for a ML operation. The core 530 is also configured to process a plurality of performance non-critical operations, e.g., data/instruction preparatory work, data collection, data mapping, etc. The core 530 is coupled to an instruction-streaming engine 550, which accepts instructions destined for the inference engine 560 from the core 530 and distributes the instructions to the appropriate units within the inference engine 560. The inference engine 560 is configured to perform dense and sparse operations on received stream of data, e.g., to identify a subject in an image, by using the training data and executing the programming instructions received from the instruction-streaming engine 550.

In some embodiments, the inference engine 560 includes a two-dimensional computing array of processing tiles, e.g., tiles 0, . . . , 63, arranged in, e.g., 8 rows by 8 columns. Each processing tile (e.g., tile 0) includes at least one on-chip memory (OCM) e.g., 5510, one POD engine (or POD), e.g., 5520, and one processing engine/element (PE), e.g., 5530. Here, the OCMs in the processing tiles are configured to receive data from the data streaming engine 540 in a streaming fashion. The OCMs enable efficient local access to data per processing tile. The PODs are configured to perform dense or regular computations on the received data in the OCMs, e.g., matrix operations such as multiplication, matrix manipulation, tanh, sigmoid, etc., and the PEs are configured to perform sparse/irregular computations and/or complex data shape transformations of the received data in the OCMs, e.g., memory transpose, addition operation, operations on irregular data structures (such as trees, graphs, and priority queues), respectively. Both the PODs and the PEs can be programmed according to the programming instructions received from the instruction-streaming engine 550. Accordingly, the data is received and processed by each processing tile as an input data stream from the DDR memory 520 and the result is output by each processing tile as a stream of data to the DDR memory 520.

In some embodiments, a plurality of (e.g., four) processing tiles together form a processing block or quad, e.g., processing tiles 0-3 forms processing block 5550, wherein the processing tiles within each processing block are coupled to one another via a routing element 5540. In some embodiments, all the routing elements are connected together as a mesh interconnect to connect the processing blocks in the same row or column as a two-dimensional array. It is appreciated that the number and/or types of components within each processing tile, the formation of the processing blocks, the number of processing tiles in each processing block, and the number of processing blocks in each row and column of the inference engine 560 as shown in FIG. 5 are exemplary and should not be construed as limiting the scope of the embodiments. In some embodiments, the same number of PE and POD may be used for each tile, and the same number of blocks may be used in each row and column in order to provide flexibility and scalability.

Figure 6:
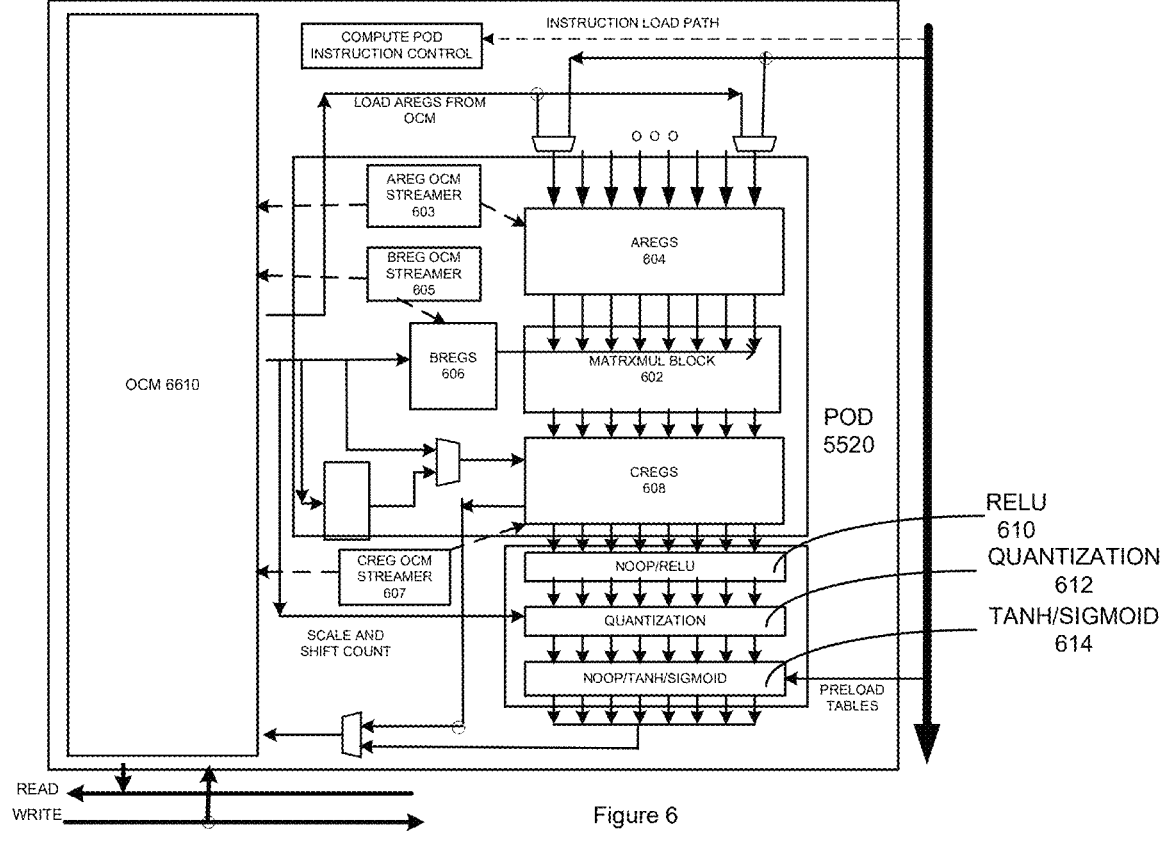
FIG. 6 shows a processing engine configured to perform dense-matrix computation according to one aspect of the embodiments.

In the example of FIG. 6, the POD engine 5520 is configured to perform dense-matrix computation such as matrix-matrix multiply and element-wise matrix operations on data in the OCM 6610. It is appreciated that the number of components, the size of the components, and the number of bits, matrix sizes, etc., shown in FIGS. 5-6 are for illustrative purposes and not intended to limit the scope of the embodiments. In the example of FIG. 6, the POD 5520 includes a matrix multiplication block 602, which is a two-dimensional array having X number of rows and Y number of columns, wherein each element/cell in the array has a certain number of registers maintaining data streamed to and from the OCM 6610. The matrix multiplication block 602 is configured to multiply two matrices, matrix A of X number of rows and Z number of columns and matrix B of Z number of rows and Y number of columns to generate a matrix C of X number of rows and Y number of columns. In some embodiments, the matrix multiplication block 602 is fed by A registers 604 and B registers 606, which hold the two matrices, A and B, for multiplication by the matrix multiplication block 602, respectively. The matrix data are written into A registers 604 and B registers 606 from the OCM 6610 by Areg OCM streamer 603 and Breg OCM streamer 605, respectively. Partial result of the multiplication of the two matrices by the matrix multiplication block 602 is accumulated and saved in C registers 608, which is then streamed to the OCM 6610 via Creg OCM streamer 607. In some embodiments, the matrix multiplication block 602 and the register streamers are programmed using instructions from the instruction streaming engine 550, wherein the instructions specify the address, length and stride of the stream to be loaded from the OCM 6610 and the matrix multiplication operations performed by the matrix multiplication block 602. In some embodiments, the data loading instructions are stalled when the registers and/or buffers are full and will resume when there is space to accommodate the data.

During matrix multiplication, the POD engine 5520 is configured to perform a plurality of inline post processing operations immediately on output from the matrix multiplication block 602 saved in the C registers 608 without having to transmit and save the output to the OCM 6610 first and then read the C matrix from the OCM 6610 again for these post matrix multiplication operations. By bypassing the roundtrip to the OCM 6610, the inline post processing operations following the matrix multiplication saves time and improves efficiency of the ML operation by the inference engine 560. As shown by the example of FIG. 6, the inline post processing operations supported by the POD engine 5520 include but are not limited to a rectified linear operation by an inline rectified linear unit (ReLU) 610, a quantization operation by an inline quantization unit 612, and Tanh or Sigmoid operation by an inline tanh/sigmoid unit 614.

In some embodiments, the tanh/sigmoid unit 614 of the POD engine 5520 is configured to perform tanh and/or sigmoid operations/functions on each element of the output from the matrix multiplication block 602 on per-element basis before writing the output to the OCM 6610. In some embodiments, the tanh/sigmoid unit 614 is configured to perform the per-element operations on the output via a lookup table, wherein values of the lookup table can be preloaded into, accepted and maintained by the tanh/sigmoid unit 614 from the memory 520 by the core 530. The tanh/sigmoid unit 614 is configured to determine a corresponding value of the tanh or sigmoid operation by looking up a value x from the lookup table.

In some embodiments, since different sections and models may be used to approximate the per-element operations based on numerical analysis, the tanh/sigmoid unit 614 is configured to utilize multiple lookup tables for the per-element operations. Specifically, the tanh/sigmoid unit 614 is configured to divide the tanh or sigmoid function into multiple sections, where each section may be represented by a curve that is extrapolated based on a specific lookup table, as described above in FIGS. 1-3. The tanh/sigmoid unit 614 may then determine value of the tanh and/or sigmoid function by referencing a specific lookup table corresponding to a section associated with a known x value and fetch the value of the tanh and/or sigmoid function from the corresponding lookup table accordingly.

For floating point values (e.g., FP16), in some embodiments, the tanh/sigmoid unit 614 is configured to utilize a single lookup table to implement the tanh and/or the sigmoid operation/function without requiring the activation function to be symmetric, as described in FIGS. 1-3. In other words, for floating point input values (e.g., fp16), in some embodiments, the tanh/sigmoid unit 614 is configured to implement each of the tanh and/or the sigmoid functions as a piece-wise linear approximation for a positive/negative input range/region with a lookup table based on the exponent and a subset of mantissa values of the floating point input x. In some embodiments, the tanh/sigmoid unit 614 is configured to perform both multiplication and addition of the sigmoid operation on floating point input values by utilizing a dynamic table that provides flexibility to cover the plurality of regions including subregion each with one or more linear approximations.

Referring now to FIG. 7, a flow diagram 700 for generating and using a table for linear approximation associated with an activation function, according to one aspect of the present embodiments is shown. At step 710, a first and a second set of biased exponents associated with a first and a second plurality of input floating point data are stored respectively in a memory, as described in FIGS. 1-3. The first set of biased exponents defines a positive piecewise linear range associated with a positive piecewise linear approximation region of a function to be processed by one or more processing units. The second set of biased exponents defines a negative piecewise linear range associated with a negative piecewise linear approximation region of the function to be processed, as described above. The positive piecewise linear approximation region includes a first plurality of subregions, as described in FIGS. 1-3. The negative piecewise linear approximation region includes a second plurality of subregions, as described above. In one nonlimiting example, each subregion of the first and the second plurality of subregions includes at least one or more linear approximations. At step 720, indices data for mapping each linear approximation with each subregion of the first and the second plurality of subregions to a unique index value is stored. At step 730, an offset and a slope for each of the unique index value is stored, as described in FIGS. 1-3.

At step 740, one offset and one slope for a linear approximation associated with positive floating point data that is not within the positive piecewise linear range is stored in the memory as described in FIG. 3. At step 750, another one offset and another one slope for a linear approximation associated with negative floating point data that is not within the negative piecewise linear range is stored in the memory, as described in FIG. 3. It is appreciated that the positive and the negative piecewise linear range may be user modifiable.

At step 760, after the table is generated, as described in FIG. 3, a floating point input data is received for the function to be processed. At step 770, a sign bit and biased exponent associated with the floating point input data are used to determine whether the floating point input data is within the positive piecewise linear range or within the negative piecewise linear range, as described in FIG. 3. At step 780, in response to determining that the floating point input data is within the positive piecewise linear range or the negative piecewise linear range, is configured to determine a subregion of the positive piecewise linear range or a subregion of the negative piecewise linear range based on the biased exponent, and wherein the processing unit or the another processing unit is further configured to determine an index associated with the floating point input data using a subset of mantissa bits of floating point input data, as described above. At step 790, an offset and a slope associated with the determined index is fetched from the table, as described above. It is appreciated that an output value for the floating point input data may be calculated by processing the linear approximation using the offset and the slope associated with the determined index.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system, comprising:
a memory configured to store data, wherein the memory includes a first segment and a second segment; and
a processing unit configured to
    store a first and a second set of biased exponents associated with a first and a second plurality of input floating point data respectively in the first segment of the memory, wherein the first set of biased exponents defines a positive piecewise linear range associated with a positive piecewise linear approximation region of a function to be processed by the processing unit or another processing unit, wherein the second set of biased exponents defines a negative piecewise linear range associated with a negative piecewise linear approximation region of the function to be processed by the processing unit or another processing unit, wherein the positive piecewise linear approximation region includes a first plurality of subregions, wherein the negative piecewise linear approximation region includes a second plurality of subregions, and wherein each subregion of the first and the second plurality of subregions includes at least one or more linear approximations,
    store indices data associated with the first plurality of subregions and the second plurality of subregions in the first segment, wherein the indices data maps a unique index to each linear approximation of the at least one or more linear approximations in the first and the second plurality of subregions; and
    store an offset and a slope for each unique index associated with its corresponding linear approximation.

2. The system of claim 1, wherein the first segment of the memory stores uint format data type and wherein the second segment of the memory stored a floating point (FP) format data type.

3. The system of claim 2, wherein the first and the second plurality of input floating point data are a FP16, and wherein the first segment is an uint8 and wherein the second segment is a FP16.

4. The system of claim 1, wherein the first and the second plurality of input floating point (FP) data are one of a FP4, FP8, FP16, FP32, FP9, FP64, or brain FP16 (Bfloat16).

5. The system of claim 1, wherein the positive and the negative piecewise linear range are user modifiable.

6. The system of claim 1, wherein the processing unit or another processing unit is configured to receive a floating point input data for the function to be processed, wherein the processing unit or another processing unit is configured to use a sign bit and biased exponent associated with the floating point input data to determine whether the floating point input data is within the positive piecewise linear range or within the negative piecewise linear range, and wherein the processing unit or another processing unit, in response to determining that the floating point input data is within the positive piecewise linear range or the negative piecewise linear range, is configured to determine a subregion of the positive piecewise linear range or a subregion of the negative piecewise linear range based on the biased exponent, and wherein the processing unit or the another processing unit is further configured to determine an index associated with the floating point input data using a subset of mantissa bits of floating point input data and fetch an offset and a slope associated with the determined index.

7. The system of claim 6, wherein the processing unit is configured to calculate an output value for the floating point input data by processing the linear approximation using the offset and the slope associated with the determined index.

8. The system of claim 1, wherein the processing unit is configured to store another offset and another slope in the first segment, wherein the another offset and the another slope are associated with a linear approximation for positive floating point data that is not within the positive piecewise linear range.

9. The system of claim 1, wherein the processing unit is configured to store another offset and another slope in the first segment, wherein the another offset and the another slop are associated with a linear approximation for negative floating point data that is not within the negative piecewise linear range.

10. A system, comprising:

a processing unit configured to process data; and a memory configured to store data, wherein the memory includes a first segment and a second segment, wherein the processing unit is configured to store biased exponents associated with a first plurality of input floating point data in the first segment, wherein the biased exponents define a piecewise linear range associated with at least one piecewise linear approximation region of a function to be processed by processing unit or another processing unit, wherein the at least one piecewise linear approximation region includes a plurality of subregions, wherein the processing unit is configured to store indices data associated with each subregion of the plurality of subregions in the first segment, wherein the indices data associated with the each subregion of the plurality of subregions identify an index associated with a starting subregion of the each subregion of the plurality of subregions and a number of piecewise linear approximations associated with the each subregion of the plurality of subregions, wherein the processing unit is configured to generate indices based on the indices data, wherein the indices are associated with a number of piecewise linear approximations within the at least one piecewise linear approximation region, wherein the processing unit is configured to store an offset and a slope for each index of the indices in the second segment, wherein the offset and the slope for the each index is linear approximation for its respective linear approximation region.

11. The system of claim 10, wherein the piecewise linear range includes a positive range and a negative range, and wherein one set of biased exponents associated the first plurality of input floating point data is associated with the positive range and wherein another set of biased exponents associated with the first plurality of input floating point data is associated with the negative range, and wherein the piecewise linear range includes a positive piecewise linear range and a negative piecewise linear range.

12. The system of claim 11, wherein the indices are associated with the positive piecewise linear range and the negative piecewise linear range.

13. The system of claim 11, wherein the processing unit is configured to store at least one offset and one slope in the first segment wherein the at least one offset and one slope are associated with linear approximation of a region within the positive range other than the positive piecewise linear range, and wherein the processing unit is configured to store at least another offset and another slope in the first segment wherein the at least another offset and the another slope are associated with linear approximation of a region within the negative range other than the negative piecewise linear range, wherein the at least one offset and the one slope and the at least another offset and the another slope are stored in the second segment.

14. The system of claim 10, wherein the first segment stores data in uint format type and wherein the second segment stores data in a floating point (FP) format type.

15. The system of claim 14, wherein the first plurality of input data is a FP16, and wherein the first segment is an uint8 and wherein the second segment is a FP16.

16. The system of claim 10, wherein the first plurality of input data is one of a floating point (FP)4, FP8, FP16, FP32, FP9, FP64, or brain FP16 (BFP16).

17. The system of claim 10, wherein the piecewise linear range is user modifiable.

18. The system of claim 10, wherein the processing unit is configured to receive a floating point input data for the function to be processed, wherein the processing unit or another processing unit is configured to use a sign bit and biased exponent associated with the floating point input data to determine whether the floating point input data is within the piecewise linear range, and wherein the processing unit or another processing unit, in response to determining that the floating point input data is within the piecewise linear range, is configured to determine a subregion of the piecewise linear range based on the biased exponent, and wherein the processing unit or the another processing unit is further configured to determine an index associated with the floating point input data using a subset of mantissa bits of floating point input data and fetch an offset and a slope associated with the determined index.

19. The system of claim 18, wherein the processing unit is configured to calculate an output value for the floating point input data by processing the linear approximation using the offset and the slope associated with the determined index.

20. A system comprising:

a processing unit configured to process data; and a memory configured to store data, wherein the processing unit is configured to store a first and a second set of biased exponents associated with a first and a second plurality of input floating point data respectively in the memory, wherein the first set of biased exponents defines a positive piecewise linear range associated with a positive piecewise linear approximation region of a function to be processed by processing unit or another processing unit, and wherein the second set of biased exponents defines a negative piecewise linear range associated with a negative piecewise linear approximation region of the function to be processed, wherein the positive piecewise linear approximation region includes a first plurality of subregions, and wherein the negative piecewise linear approximation region includes a second plurality of subregions, wherein each subregion of the first and the second plurality of subregions includes at least one or more linear approximations, wherein the processing unit is configured to store indices data for mapping each linear approximation with each subregion of the first and the second plurality of subregions to a unique index value, wherein the processing unit is configured to store an offset and a slope for each of the unique index value.

21. The system of claim 20, wherein the processing unit is configured to store one offset and one slope for a linear approximation associated with positive floating point data that is not within the positive piecewise linear range in the memory, and wherein the processing unit is configured to store another one offset and another one slope for a linear approximation associated with negative floating point data that is not within the negative piecewise linear range in the memory.

22. The system of claim 20, wherein the positive and the negative piecewise linear range are user modifiable.

23. The system of claim 20, wherein the processing unit or another processing unit is configured to receive a floating point input data for the function to be processed, wherein the processing unit or another processing unit is configured to use a sign bit and biased exponent associated with the floating point input data to determine whether the floating point input data is within the positive piecewise linear range or within the negative piecewise linear range, and wherein the processing unit or another processing unit, in response to determining that the floating point input data is within the positive piecewise linear range or the negative piecewise linear range, is configured to determine an index associated with the floating point input data using a subset of mantissa bits of floating point input data and fetch an offset and a slope associated with the determined index.

24. The system of claim 23, wherein the processing unit or another processing unit is configured to calculate an output value for the floating point input data by processing the linear approximation using the offset and the slope associated with the determined index.

25. A method comprising:

storing a first and a second set of biased exponents associated with a first and a second plurality of input floating point data respectively in a memory, wherein the first set of biased exponents defines a positive piecewise linear range associated with a positive piecewise linear approximation region of a function to be processed by processing unit or another processing unit, and wherein the second set of biased exponents defines a negative piecewise linear range associated with a negative piecewise linear approximation region of the function to be processed, wherein the positive piecewise linear approximation region includes a first plurality of subregions, and wherein the negative piecewise linear approximation region includes a second plurality of subregions, wherein each subregion of the first and the second plurality of subregions includes at least one or more linear approximations;

storing indices data for mapping each linear approximation with each subregion of the first and the second plurality of subregions to a unique index value; and storing an offset and a slope for each of the unique index value.

26. The method of claim 25 further comprising:

storing one offset and one slope for a linear approximation associated with positive floating point data that is not within the positive piecewise linear range in the memory; and storing another one offset and another one slope for a linear approximation associated with negative floating point data that is not within the negative piecewise linear range in the memory.

27. The method of claim 25, wherein the positive and the negative piecewise linear range are user modifiable.

28. The method of claim 25 further comprising:

receiving a floating point input data for the function to be processed;

using a sign bit and biased exponent associated with the floating point input data to determine whether the floating point input data is within the positive piecewise linear range or within the negative piecewise linear range;

in response to determining that the floating point input data is within the positive piecewise linear range or the negative piecewise linear range, determining a subregion of the positive piecewise linear range or a subregion of the negative piecewise linear range based on the biased exponents, and determining an index associated with the floating point input data using a subset of mantissa bits of floating point input data; and fetching an offset and a slope associated with the determined index.

29. The method of claim 28 further comprising calculating an output value for the floating point input data by processing the linear approximation using the offset and the slope associated with the determined index.

30. A system comprising:

a means for storing a first and a second set of biased exponents associated with a first and a second plurality of input floating point data respectively in a memory, wherein the first set of biased exponents defines a positive piecewise linear range associated with a positive piecewise linear approximation region of a function to be processed by processing unit or another processing unit, and wherein the second set of biased exponents defines a negative piecewise linear range associated with a negative piecewise linear approximation region of the function to be processed, wherein the positive piecewise linear approximation region includes a first plurality of subregions, and wherein the negative piecewise linear approximation region includes a second plurality of subregions, wherein each subregion of the first and the second plurality of subregions includes at least one or more linear approximations;

a means for storing indices data for mapping each linear approximation with each subregion of the first and the second plurality of subregions to a unique index value; and a means for storing an offset and a slope for each of the unique index value.

31. The system of claim 30 further comprising:

a means for storing one offset and one slope for a linear approximation associated with positive floating point data that is not within the positive piecewise linear range in the memory; and a means for storing another one offset and another one slope for a linear approximation associated with negative floating point data that is not within the negative piecewise linear range in the memory.

32. The system of claim 30, wherein the positive and the negative piecewise linear range are user modifiable.

33. The system of claim 30 further comprising:

a means for receiving a floating point input data for the function to be processed;

a means for using a sign bit and biased exponent associated with the floating point input data to determine whether the floating point input data is within the positive piecewise linear range or within the negative piecewise linear range;

a means for determining an index associated with the floating point input data using a subset of mantissa bits of floating point input data in response to determining that the floating point input data is within the positive piecewise linear range or the negative piecewise linear range; and a means for fetching an offset and a slope associated with the determined index.

34. The system of claim 33 further comprising calculating an output value for the floating point input data by processing the linear approximation using the offset and the slope associated with the determined index.

* * * * *